(12) United States Patent
Nishiyama

(10) Patent No.: US 9,104,522 B2
(45) Date of Patent: Aug. 11, 2015

(54) DATA REWRITE SYSTEM FOR VEHICLE, IN-VEHICLE APPARATUS AND REWRITE APPARATUS

(71) Applicant: DENSO CORPORATION, Kariya, Aichi-pref. (JP)

(72) Inventor: Atsushi Nishiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 13/664,985

(22) Filed: Oct. 31, 2012

(65) Prior Publication Data

US 2013/0132686 A1    May 23, 2013

(30) Foreign Application Priority Data

Nov. 21, 2011    (JP) .................................. 2011-253975

(51) Int. Cl.
*G06F 12/00* (2006.01)
*G06F 9/445* (2006.01)

(52) U.S. Cl.
CPC ...................................... *G06F 8/665* (2013.01)

(58) Field of Classification Search
USPC .............. 711/5, 103, 170, 173; 717/168, 169, 717/170
See application file for complete search history.

(56) References Cited

U.S. PATENT DOCUMENTS

| 2005/0270888 | A1  | 12/2005 | Watanabe et al. |
| 2006/0259207 | A1* | 11/2006 | Natsume ........................... 701/1 |
| 2007/0005204 | A1  | 1/2007  | Yamamoto et al. |
| 2014/0068590 | A1* | 3/2014  | Natsume ....................... 717/170 |

FOREIGN PATENT DOCUMENTS

| CN | 1892599     | 1/2007  |
| JP | 2001-034460 | 2/2001  |
| JP | 2005-088673 | 4/2005  |
| JP | 2005-332148 | 12/2005 |
| JP | 2006-301960 | 11/2006 |
| JP | 2007-310690 | 11/2007 |
| JP | 2009-042850 | 2/2009  |
| JP | 2009-053920 | 3/2009  |

OTHER PUBLICATIONS

Office action dated Mar. 26, 2014 in corresponding Korean Application No. 1 0-2012-131769.

(Continued)

*Primary Examiner* — John Lane
(74) *Attorney, Agent, or Firm* — Harness, Dickey & Pierce, PLC

(57) ABSTRACT

A data rewrite system including an in-vehicle apparatus and a rewrite apparatus is disclosed. The in-vehicle apparatus stores multiple operation data units in multiple storage areas and outputs version information of the operation data units and information about the storage areas to the rewrite apparatus. The rewrite apparatus selects a target storage area, which is a target for data update, from the storage areas of the in-vehicle apparatus by comparing the versions information, of the operation data units with version information of update data units. The rewrite apparatus updates the selected target storage area with the update data unit that corresponds to the operation data unit in the target storage area.

3 Claims, 2 Drawing Sheets

(56) References Cited

OTHER PUBLICATIONS

Office action dated Jan. 7, 2014 in corresponding Japanese Application No. 2011-253975.

Office action dated Jan. 30, 2015 in corresponding Chinese Application No. 201210470829.9.

* cited by examiner

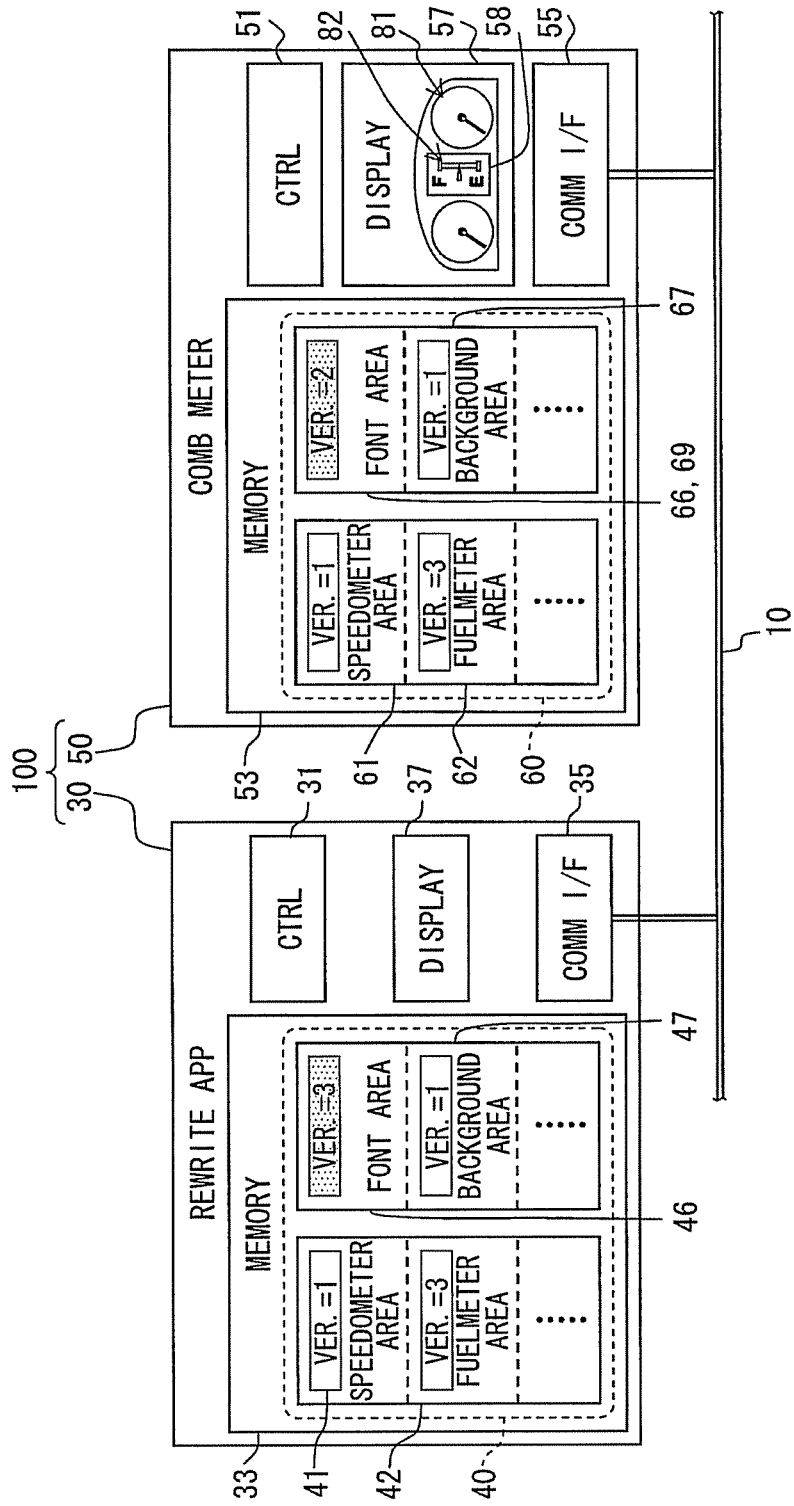

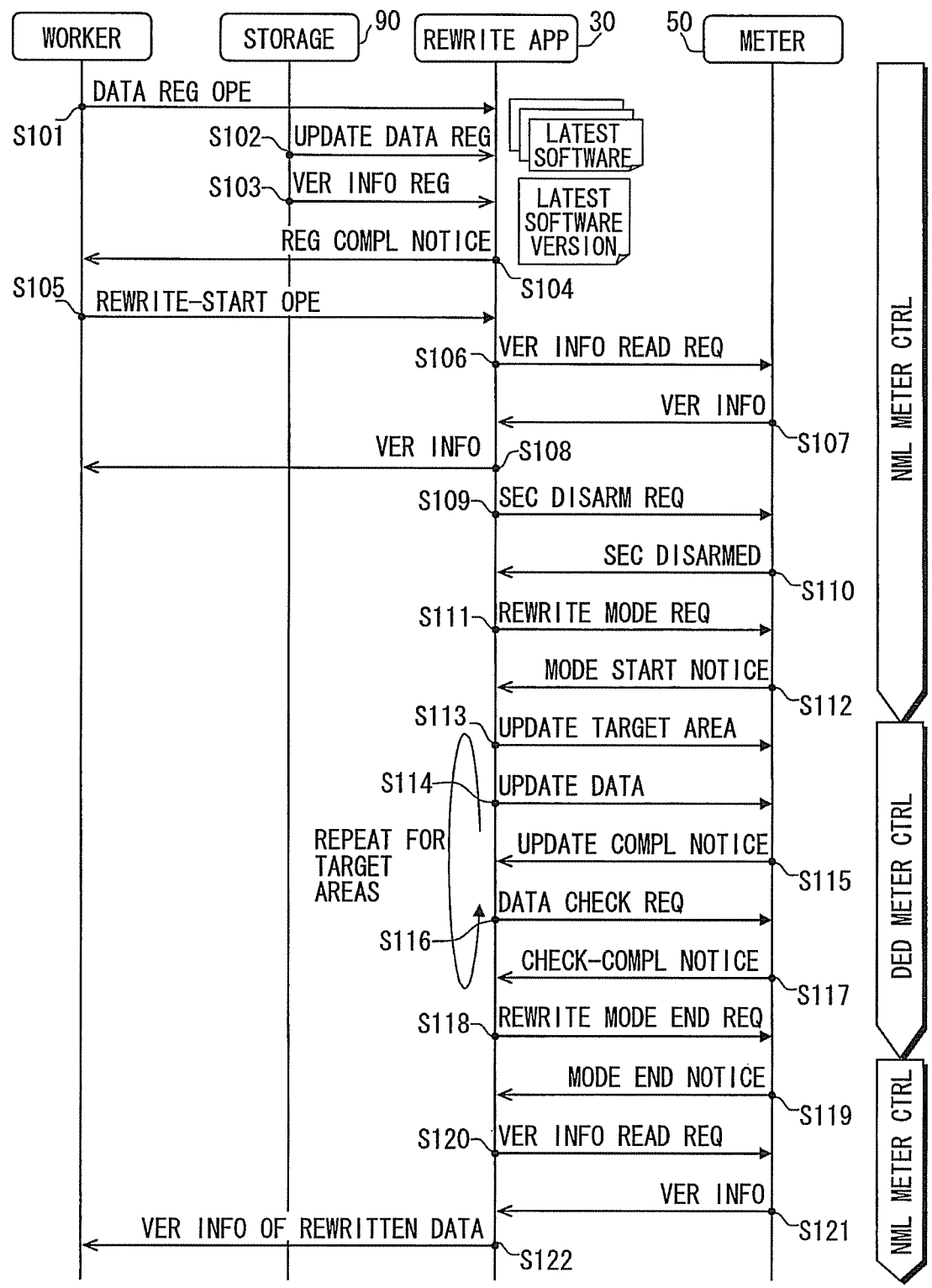

DATA REWRITE SYSTEM FOR VEHICLE, IN-VEHICLE APPARATUS AND REWRITE APPARATUS

CROSS REFERENCE TO RELATED APPLICATION

The present application is based on and claims priority to Japanese Patent Application No. 2011-253975 filed on Nov. 21, 2011, disclosure of which is incorporated herein by reference.

TECHNICAL FIELD

The present disclosure relates to a rewrite system for a vehicle, which includes an in-vehicle apparatus mounted to a vehicle and a rewrite apparatus configured to rewrite a data stored in the in-vehicle apparatus. The present disclosure also relates to an in-vehicle, apparatus and a rewrite apparatus.

BACKGROUND

As a technique relating to rewriting a data stored in an in-vehicle apparatus; JP-2005-332148A (corresponding to US 2005/0270888A) discloses a rewrite system for rewiring a stored data of an in-vehicle controller. In the rewrite system disclosed in JP-2005-332148A, when the rewrite apparatus is connected to a vehicle, the rewrite apparatus sends a rewrite data to the in-vehicle controller. In this way, the data stored in a non-volatile memory of the in-vehicle control unit is rewritten with the new rewrite data.

As a technique relating to rewriting a data stored in a non-volatile memory of a digital composite machine, JP-2007-310690 discloses a firmware update method. In JP-2007-310690, the non-volatile memory of the digital composite machine is divided into multiple sections, and multiple firmwares are allocated to and stored in the respective sections. When an external storage medium storing a new version firmware is connected to the digital composite machine, the digital composite machine compares, on a section-by-section basis, a version information of the present firmware with the version information of the firmware stored in the external storage medium. Then, the digital composite machine selects an update candidate firmware and informs an operator of the update candidate firmware. When the operator selects the firmware to be updated, the digital composite machine updates the section storing the selected firmware with the new version firmware corresponding to the presently-stored firmware.

In the update method disclosed in JP-2007-310690, since firmware update is performed to update-required part of the sections, an amount of time taken to rewrite a data can be shortened as compared with the case of JP-2005-332148A in which the data in all the storage areas is rewritten. In view of this, the inventor of the present application tried to apply the update method of JP-2007-310690 to a system which rewrites a data stored in an in-vehicle apparatus. However, the inventor of the present application encountered and found out the following difficulty.

In the update method of JP-2007-310690, the digital composite machine selects a section storing an update target firmware from among multiple sections. When this kind of configuration of selecting the update target firmware by comparing the version information of the present firmwares with the version information of the firmwares in the external storage medium is applied to the in-vehicle apparatus, it is unavoidable that the in-vehicle apparatus becomes complicated. Therefore, although the technique disclosed in JP-2007-310690 can shorten the amount of time taken to rewrite the data, it is difficult to apply this technique to a data rewrite system for a vehicle.

SUMMARY

In view of the foregoing, it is an object of the present disclosure to provide a data rewrite system for a vehicle that can speed up data rewriting while maintaining a simple configuration of an in-vehicle apparatus.

According to one example of the present disclosure, a data rewrite system for a vehicle includes: an in-vehicle apparatus mountable to the vehicle; and a rewrite apparatus connectable to the in-vehicle apparatus to rewrite a data stored in the in-vehicle apparatus. The in-vehicle apparatus includes an operation data storage section and an output section. The operation data storage section is divided into multiple storage areas. Multiple operation data units, which are used for the in-vehicle apparatus to operate, are allocated to and stored in the multiple areas. A version information of each of the multiple operation data units is stored in the operation data storage section. The output section is configured to output the version informations of the multiple operation data units and information about the multiple storage areas to the rewrite apparatus while associating the multiple storage areas with the version informations of the multiple operation data units. The rewrite apparatus includes an update data storage section, a selection section and an update section. The update data storage section is configured to store multiple update data units and a version information of each of the multiple update data units. The multiple update data units correspond to the multiple operation data units stored in the operation data storage section. The selection section is configured to select a target storage area, which is a target for data update, from the multiple storage areas of the operation data storage section by comparing the versions informations of the multiple operation data units, which are outputted from the output section, with the version informations of the multiple update data units stored in the update data storage section. The update section is configured to update the selected target storage area with the update data unit that corresponds to the operation data unit presently stored in the target storage area.

According to the above data rewrite system, since the output section of the in-vehicle apparatus outputs the version informations of the multiple operation data units and the information about the multiple storage areas storing the multiple operation data units to the rewrite apparatus while associating the version informations of the multiple operation data units with the multiple storage areas, the selection section configured to select the target storage area can be placed in the rewrite apparatus. Since the selection section, which selects the target storage area by comparing the version informations of the operation data units with the version informations of the update data units, can be placed in the rewrite apparatus, a configuration corresponding to the selection section is omissible from the in-vehicle apparatus, and therefore, it is possible to prevent the in-vehicle apparatus from becoming complicated.

Furthermore, according to the above data rewrite system, the target storage area selected by the selection section is updated by the update section so that the operation data unit presently stored in the target storage area is updated with the corresponding update data unit. As a result, an amount of time required to rewrite the data of the operation date storage section can be shortened as compared with cases where the data of all the storage areas of the operation date storage section is rewritten. Therefore, the data rewrite system can speed up the data rewriting while maintaining a simple configuration of the in-vehicle apparatus.

BRIEF DESCRIPTION OF THE DRAWINGS

The above and other objects, features and advantages, of the present disclosure will become more apparent from the following detailed description made with reference to the accompanying drawings. In the drawings:

FIG. 1 is a diagram illustrating a configuration of a data rewrite system of one embodiment; and FIG. 2 is a sequence diagram illustrating operations and processes performed when a data of a combination meter is rewritten.

DETAILED DESCRIPTION

Embodiments will be described with reference to the drawings.

A data rewrite system 100 of one embodiment includes a combination meter 50, a rewrite apparatus 30, and others. In the data rewrite system 100, the rewrite apparatus 30 rewrites a data stored in the combination meter 50. In the following, a configuration of the data rewrite system 100 will be described in detail based on FIG. 1.

The combination meter 50 is one of multiple in-vehicle apparatuses mounted to a vehicle, and provides a user with a variety of information about the vehicle. The combination meter 50 includes a display control circuit 51, a communication interface 55, a display device 57, and a memory device 53 for display.

The display control circuit 51 includes a microcomputer or the like. The display control circuit 51 includes a processor for performing various computation processes, a random access memory (RAM) functioning as a working area in computation, and an input output interface for performing data exchanging with the communication interface 55 and the memory device 53. The communication interface 55 is connected to a controller area network (CAN) bus 10. The CAN bus 10 can serve as a transmission line used for data transmission between in-vehicle apparatuses on an in-vehicle communication network. The in-vehicle communication networks connects multiple in-vehicle apparatus mounted to the vehicle. The display device 57 includes multiple indicators, a liquid crystal display 58 and the like, and displays the information about the vehicle to a driver. The indicator of the display device 57 may be a digital meter or an analog meter. The indicator of the display device 57 may or may not have an indicating needle. For example, as the indicator having an indicating needle, the display device 57 displays a speedometer 81 for displaying speed. Additionally, the display device 57 can switchably display multiple images on the liquid crystal display 58. The multiple images include, for example, an image indicative of a remaining level of fuel in a fuel tank.

The memory device 33 is, for example, a non-volatile semiconductor memory device such as a flash memory and the like. The memory device 33 stores multiple softwares used for the rewrite apparatus 30 to operate. Further, the memory device 33 can reserve multiple storage areas for storing multiple update data units 40. Specifically, when the operation data units 60 stored in the memory device 53 are to be rewritten, the multiple storage areas including a speedometer area 41, a fuelmeter area 42, a font area 46, a background area 47 etc. are provided in the memory device 33, so that these storage areas correspond to those in the memory device 53. Multiple update data units 40 are allocated to and stored in the above storage areas of the memory device 53. Unique version information is assigned to each update data unit 40, like the unique version information is assigned to each operation data unit 60. The memory device 33 stores the version information of respective update data units 40 stored in the storage areas.

When the rewrite apparatus 30 is connected to the CAN bus 10 of the vehicle, the rewrite apparatus 30 can communicate with multiple in-vehicle apparatuses including the combination meter 50. By communicating with the in-vehicle apparatuses, the rewrite apparatus 30 can rewrite the data stored in these in-vehicle apparatuses. The rewrite apparatus 30 includes a rewrite control circuit 31, a communication interface 35, a display device 37, and a memory device 33 for rewriting.

The rewrite control circuit 31 includes a microcomputer or the like. The display control circuit 51 includes a processor for performing various computation processes, a RAM functioning as a working area in computation, and an input output interface for performing data exchange with the communication interface 35 and the memory device 33. When a connector of the rewrite apparatus 30 is connected to a connector of the vehicle, the communication interface 35 is communicably connected to the CAN bus 10 of the vehicle. The display device 37 includes a liquid crystal display or the like. The display device 37 displays information about in-vehicle apparatuses, which is acquired by the rewrite control circuit 31 through the CAN bus 10.

The memory device 33 is, for example, a non-volatile semiconductor memory device such as a flush memory and the like. The memory device 33 stores multiple softwares used for the rewrite apparatus 30 to operate. Further, the memory device 33 can reserve multiple storage areas for storing multiple update data units 40. Specifically, when the operation data units 60 stored in the memory device 53 are to be rewritten, the multiple storage areas including a speedometer area 41, a fuelmeter area 42, a font area 46, a background area 47 etc. are provided in the memory device 33, so that these storage areas correspond to those in the memory device 53. Multiple update data units 40 are allocated to and stored in the above storage areas of the memory device 53. An unique version information is assigned to each update data unit 40, like the unique version information is assigned to each operation data unit 60. The memory device 33 stores the version informations of respective update data units 40 stored in the storage areas.

Processes in the data rewrite system 100, including connecting the rewrite apparatus 30 to the CAN bus 10 and rewriting the operation data unit 60 of the combination meter 50, will be described with reference to FIGS. 1 and 2. The rewrite apparatus 30 and the combination meter 50 perform the below-described processes by, for example, executing predetermined programs with the control circuits 31 and 51. FIG. 2 illustrates a rewriting operation conducted by a worker, a process performed by the rewrite apparatus, and a process performed by the combination meter 50. The vertical axis of FIG. 2 is a time axis, which shows a flow of operation and process.

The worker connects the storage medium 90, which stores latest softwares corresponding to the operation data units 60, to the rewrite apparatus 30. Thereafter, at S101, the worker performs an operation of registering the latest softwares, which are stored in the storage medium 90, in the memory device 33 of the rewrite apparatus 30. In response, at S102, the rewrite apparatus 30 reads out the latest softwares from the storage medium 90, and registers the latest softwares as the update data units 40 in respective storage areas of the memory device 33. At S103 the rewrite apparatus 30 registers the version informations assigned to the update data units 40 in the memory device 33 while associating the version informations with the storage areas storing the update data units 40. Upon completion of the above registration process, the rewrite apparatus 30 notifies the worker of the completion of the registration process by using the display of the display device 37.

The worker disconnects the storage medium 90 from the rewrite apparatus 30, and thereafter, the worker connects the rewrite apparatus 30 to the CAN bus 10 of the vehicle. Then, at S105, the worker operates the rewrite apparatus 30 to start a process of rewriting the operation data units 60 stored in the combination meter 50. In response, at S106, the rewrite apparatus 30 requests the combination meter 50 to read out the version informations of the operation data units 60 presently-stored in the storage areas of the memory device 53. Accordingly, the display control circuit 51 of the combination meter 50 reads out the version informations of respective operation data units 60 from the memory device 53, and additionally, the display control circuit 51 generates a table indicative of association between the storage areas storing these operation data units 60 and the version informations of the operation data units 60. Thereafter, at S107, the combination meter 50 outputs the generated table to the CAN bus 10 to notify the rewrite, apparatus 30 of the version informations of the operation data units 60 corresponding to all of storage areas.

Based on the above notification, the rewrite apparatus 30 compares the version informations of the operation data units 60, which are outputted from the rewrite apparatus 30, with the version informations of the update data units 40 stored in the memory device 33. Then, the rewrite apparatus 30 checks the presence and absence of version difference between each operation data, unit 60 and the corresponding update data unit 40, and the rewrite apparatus 30 selects a target, storage area 69, which is an update target, from the storage areas. In the above, the target storage area 69 may be the storage area in which the updated data unit 40 newer than the operation data unit 60 is registered. At S108, the rewrite apparatus 30 gives the worker a notification about the version informations acquired from, the combination meter 50, by using the display device 37.

It may be preferable that, as the notification given at S108, the display device 37 display the following items. As a first item, the version informations of the present operation data units 60 and the version informations of the update data units 40 are displayed side by side to enable comparison. As a second item, details of the operation data unit 60 stored in the target storage area 69 and (ii) an amount of time taken to perform the rewriting process are displayed. As a third item, the display device 37 notifies that the target storage area 69 can be arbitrarily changed (e.g., cancelled, added) according to, for, example, a user preference or the like depending on its purpose.

After giving the notification to the worker by using the display device 37, the rewrite apparatus 30 performs S109 if the target storage area 69 has been selected. At S109, the rewrite apparatus 30 requests the combination meter 50 to disarm a security, which is provided to prevent an outside (e.g., outside stranger) from performing data rewriting. In response, the combination meter 50 disarms the security and outputs a security disarm notification to the rewrite apparatus 30 to indicate that the target storage area 69 can be updated.

Upon completion of the above process for authentication of the rewrite apparatus 30, the rewrite apparatus 30 performs S111. At S111, the rewrite apparatus 30 requests the combination meter 50 that the display control circuit 51 transition to a rewriting mode. The combination meter 50 switches operation mode of the display control circuit 51 from a normal mode, in which the display, control circuit 51 performs normal meter control for displaying information, to the rewriting mode, in which the display control circuit 51 performs control that is dedicated to rewriting the memory device 53. Thereafter, the combination meter 50 notifies the rewrite apparatus 30 that the transition to the rewriting mode has been completed.

Next, at S113, the rewrite apparatus 30 notifies the combination meter 50 of the target storage area 69. In the above, when multiple target storage areas 69 have been selected, one target storage area 69 of the multiple target storage areas 69 is notified to the combination meter 50 at S113. When one target storage area 69 has been selected, this one target storage area 69 is notified to the combination meter 50. Then, at S114, the rewrite apparatus 30 sends the update data unit 40, with which the operation data unit 60 in the selected one target storage area 69 is to be overwritten, to the combination meter 50. The display control circuit 51 of the combination meter 50 receives the update data unit 40 from the rewrite apparatus 30 and records the received update data unit 40 in the notified target storage area 69. Through the above manners, the rewrite control circuit 31 updates, with the update data unit 40, the operation data unit 60 presently-stored in the target storage area 69 by notifying the display control circuit 51 and performing data transmission to the display control circuit 51. Upon completion of the update of the operation data unit 60 in the one target storage area 69, the combination meter 50 performs S115. At S115, the combination meter 50 notifies the rewrite apparatus 30 that the update has been completed.

At S116, based on receipt of the update completion notification, the rewrite apparatus 30 requests the combination meter 50 to check the updated operation data unit 60. Based on this request, the combination meter 60 checks the updated latest operation data unit 60. When it is confirmed that the update has been properly completed, the combination meter 50 notifies the rewrite apparatus 30 that the update has been properly completed. The rewrite apparatus 30 and the combination meter 50 repeatedly perform the above rewriting process S113 to S117 multiple times to update multiple target storage areas 69 if there are the multiple target storage areas 69.

When the operation data units 60 in all of the target storage areas 69 have been updated in the above, rewriting process, the rewrite apparatus 30 performs S118 where the rewrite apparatus 30 requests the combination meter 50 to end the rewriting mode. The combination meter 50 switches the operation mode of the display control circuit 51 from the rewriting mode to the normal mode. Thereafter, at S119, the combination meter 50 notifies the rewrite apparatus 30 that the rewriting mode has ended.

At S120, the rewrite apparatus 30 again requests the combination meter 50 to read out the version informations of respective operation data units 60 presently-stored in the storage areas of the memory device 53. The display control circuit 51 of the combination meter 50 reads out the version informations of the respective operation data units 60 from the memory device 53, and additionally, the display control circuit 51 generates again a table indicative of association between the storage areas storing the operation data units 60 and the version informations. At S121, the combination meter 50 outputs the generated table to the CAN bus 10, thereby notifying the rewrite apparatus 30 of the version informations that corresponds to all of the storage areas after the rewriting process.

Based on the above notification, the rewrite apparatus 30 makes a comparison between the version informations of respective operation data units 60 after the rewriting process and the version informations of the update data units 40 stored in the memory device 33, thereby checking whether or not the update of the operation data units 60 has been normally completed. Thereafter the version informations of the present operation data units 60 and the version informations of the operation data units 60 before the rewriting process are displayed side by side by the display device 37 of the rewrite apparatus 30. In the above way, the version informations of the operation data units 60 after the rewrite process is notified to the user from the rewrite apparatus 30, and the process of rewriting the data of the combination meter 50 is ended.

In the above illustrated embodiment, since the table indicative of association between the storage areas and the version informations is outputted from the display control circuit 51 to the rewrite apparatus 30, the rewrite apparatus 30 can perform a process of selecting the target storage area(s) 69. Since this selection process is performed not in the combination meter 50 but in the rewrite apparatus 30, a configuration corresponding to this rewrite control circuit 31 is omissible from the combination meter 50. Therefore, it is possible to prevent the combination meter 50 from becoming complicated.

After the target storage area 69 is selected from the multiple storage areas of the memory device 53, the operation data unit 16 in the target storage area 69 is updated. As a result, a time taken to rewrite the data in the memory device 53 can be shortened as compared with cases where all of the storage areas of the memory device 53 are rewritten. Therefore, the data rewrite system 100 can speed up the data rewriting while maintaining, a simple configuration of the combination meter 50.

Additionally, a data amount of design data unit typically tends to be larger than a data amount of program, as is the case in the present embodiment. Moreover update frequency of design data unit typically tends to be larger than update frequency of program or the like in order to meet user preference. Because of the above, when a configuration in which the memory device 33 is divided into multiple storage areas and multiple operation data units 60 are allocated to the multiple storage areas is applied to in particular the combination meter 50 out of the in-vehicle apparatuses, this configuration can remarkably contribute to the speed up of the rewriting process. Therefore, it is possible to quickly complete the rewriting process when one of the multiple images displayed on the liquid crystal display 58 is changed, or, when wordings in a warning image is slightly changed.

Furthermore, according to the present embodiment, since the process of authenticating the rewrite apparatus 30 is performed in the combination meter 50, it is possible to prevent an unauthorized rewrite apparatus from rewriting a data of the memory device. Additionally, in the present embodiment, after the target storage area 69 is selected, the above authenticating process is performed. Thus, when all of the present operation data units 60 coincide with the corresponding update data units 60 and thus the rewriting process is not to be performed, the authenticating process is not performed. Therefore, a time taken to perform an unneeded authenticating process can be saved. Therefore, it is possible to certainly improve the speed (speed up) of the data rewriting process Furthermore, since the combination meter 50 used in the present embodiment can maintain its simple configuration, it is possible to contribute to cost reduction of a vehicle to which the combination meter 50 is mounted. Meanwhile, since the data rewrite apparatus 30 used in the present embodiment can rewrite the data of the combination meter 50 or the like at high speed, it is possible to contribute to improvement of a data rewriting work efficiency.

In the present embodiment, the rewrite control circuit 31 can correspond to a selection section or means. The rewrite control circuit 31 and the communication interface 35 in cooperation can correspond to an update section or means. The memory device 33 for rewriting can correspond to an update data storage section or means. The combination meter 50 can correspond to an in-vehicle apparatus. The display control circuit 51 and the communication interface 55 in cooperation can correspond to an output section or means. The memory device 53 for display can correspond to an operation data storage section or means. The liquid crystal display 58 can correspond to a display section or means. The speedometer area 61, the fuelmeter area 62, the font area 66, and the background area 67 can correspond to storage areas.

The above embodiment is directed to a system which rewrites the data of the combination meter 50 serving as an in-vehicle apparatus. However, the in-vehicle apparatus is not limited to the combination meter 50. For example, the system may rewrite data of various in-vehicle apparatuses including an engine control apparatus for controlling an internal combustion engine, a transmission control apparatus for controlling a transmission, a brake control apparatus for controlling a brake apparatus, and the like.

In the above embodiment, after the target storage area 69, which is an update target, is detected, the combination meter 50 performs the process of authenticating the rewrite apparatus 30. However, the authenticating process between the combination meter and the rewrite apparatus may be performed by the combination meter (i) just after the worker conducts the operation for starting the rewriting process and (ii) before the version informations are read out. An apparatus performing the process of authenticating the rewrite apparatus is not limited to the combination meter, and may be an in-vehicle apparatus other than the combination meter.

In the above embodiment, the rewrite apparatus 30 performs data exchange with the combination meter 50 through the CAN bus 10. However, a bus serving as a data transmission line is not limited to the CAN bus 10. For example, the rewrite apparatus may be connected to an in-vehicle network such as a local interconnect network (LIN) bus, a FlexRay bus and the like to rewrite a data of an in-vehicle apparatus on the in-vehicle, network. Furthermore, the rewrite apparatus may be communicably connected to an in-vehicle apparatus by a wired connection or a wireless connection.

In the above embodiment, flush memories are illustrated as the memory devices 33, 53 and the storage medium 90. However, various storages can used as the memory devices 33, 53 (storage means) and the storage medium 90 as long as they can store a data. For example, an electrically erasable programmable read-only memory (EEPROM), a hard disk drive or the like can be used for the memory devices 33, 53 (storage means) and the storage medium 90.

In the above embodiment, by the rewrite apparatus 30, the software stored in the storage medium 90 is registered in the memory device 33 as the update data units 40. However, the rewrite apparatus may be connected to a computer, and the computer may register the least software in the memory device of the rewrite processes.

In the above embodiment, the rewrite control circuit 31 notifies the target storage area(s) to the display control circuit 51, and thereafter, the rewrite control circuit 31 sends the update date unit and thereby indirectly updates the stored data in the memory device 53 via the display control circuit 51. However, the rewrite control circuit may directly update the operation data units stored in the memory device of the combination meter. That is, the rewrite control, circuit may update the operation data units not via the display control circuit. Additionally, when multiple target storage areas are selected, an order of data update may be an order of decreasing data amount of update data unit, or an order of increasing data amount of update data unit. Alternatively, consecutive numbers may be assigned to the storage areas, and an order of data update may be determined in accordance with the consecutive numbers.

In the above embodiment, at S103, the version information of the latest software is registered in the memory device 33 of the rewrite apparatus 30 independently of the latest software itself. However, if the version information is incorporated into a body of software, the rewrite apparatus may acquire the version information from the software registered at S102.

In the above embodiment, the version information is assumed to be a single-digit figure for illustrative purpose. However, this illustration does not limit the version information. For example, the version information may be a combination of multiple-digit figures, a combination of figure and alphabetical letter, or the like.

In the present disclosure, a data rewrite system for a vehicle can be provided in various forms. For example, according to one aspect, the data rewrite system may be configured as follows. The data rewrite system includes: an in-vehicle apparatus mountable to the vehicle; and a rewrite apparatus connectable to the in-vehicle apparatus to rewrite a data stored in the in-vehicle, apparatus. The in-vehicle, apparatus includes an operation data storage section and an output section. The operation data storage section is divided into multiple storage areas. Multiple operation data units, which are used for the in-vehicle apparatus to operate, are allocated to and stored in the multiple areas. A version information of each of the multiple operation data units is stored in the operation data storage section. The output section is configured to output the version informations of the multiple operation data units and information about the multiple storage areas to the rewrite apparatus while associating the multiple storage areas with the version informations of the multiple operation data units. The rewrite apparatus includes an update data storage section, a selection section and an update section. The update data storage section is configured to store multiple update data units and a version information of each of the multiple update data units. The multiple update data units correspond to the multiple operation data units stored in the operation data storage section. The selection section is configured to select a target storage area, which is a target for data update, from the multiple storage areas of the operation data storage section by comparing the versions informations of the multiple operation data units, which are outputted from the output section, with the version informations of the multiple update data units stored in the update data storage section. The update section is configured to update the selected target storage area with the update data unit that corresponds to the operation data unit presently stored in the target storage area.

According to the above data rewrite system, since the output section of the in-vehicle apparatus outputs the version informations of the multiple operation data units and the information about the multiple storage areas storing the multiple operation data units to the rewrite apparatus while associating the version informations of the multiple operation data units with the multiple storage areas, the selection section configured to select the target storage area can be placed in the rewrite apparatus. Since the selection section, which selects the target storage area by comparing the version informations of the operation data units with the version informations of the update data units, can be placed in the rewrite apparatus, a configuration corresponding to the selection section is omissible from the in-vehicle apparatus, and therefore, it is possible to prevent the in-vehicle apparatus from becoming complicated.

Furthermore, according to the above data rewrite system, the target storage area selected by the selection section is updated by the update section so that the operation data unit presently stored in the target storage are is updated with the corresponding the update data unit. As a result, an amount of time required to rewrite the data of the operation date storage section can be shortened as compared with cases where the data of all the storage areas of the operation date, storage section is rewritten. Therefore, the data rewrite system can speed up the data rewriting while maintaining a simple configuration of the in-vehicle apparatus.

The above data rewrite system may be configured as follows. The in-vehicle apparatus further includes a display section configured to display an image to indicate the information about the vehicle. At least one of the multiple operation data units in the multiple storage areas of the operation data storage section is a design data unit, which is used for the display section to draw the image.

The design data unit, which is used for the display section to draw the image, tends to have a larger data amount than, for example, a program or the like used for controlling the in-vehicle apparatus. Moreover, update frequency of design data unit tends to be larger than update frequency of program or the like in order to meet user preference. Because of the above, the configuration in which the operation data storage section is divided into the multiple storage areas and the multiple operation data units are allocated to the multiple storage areas can remarkably contribute to the speed up of the rewriting process when this configuration is applied to the in-vehicle apparatus that has the display section for displaying the image.

Furthermore, since an in-vehicle apparatus used in the above data rewrite system can maintain a simple configuration, it is possible to contribute, to cost reduction of the vehicle equipped with the in-vehicle apparatus. Since a rewrite apparatus used in the above data rewrite system can rewrite a data of an in-vehicle apparatus at high speed, it is possible to contribute to a data rewriting work efficiency.

It should be noted that each or any combination of processes, steps, means and sections illustrated in the above may be achieved as a software section or means (e.g., subroutine) and/or a hardware section or means (e.g., circuit or integrated circuit), including or not including a function of a related device; furthermore, the hardware section or means can be constructed inside of a microcomputer. Furthermore, the software section or means or any combinations of multiple software sections or means may be included in a software program, which is stored in a non-transitory computer-readable storage media or is installed in a computer via a communications network.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only, a single element, are also within the spirit and scope of the present disclosure.

What is claimed is:

1. A data rewrite system for a vehicle, comprising:
an in-vehicle apparatus mountable to the vehicle; and
a rewrite apparatus connectable to the in-vehicle apparatus to rewrite a data stored in the in-vehicle apparatus, wherein:
the in-vehicle apparatus includes:
- a display section configured to indicate information about the vehicle;
- an operation data storage section divided into a plurality of storage areas, wherein a plurality of operation data units, which is used for the in-vehicle apparatus to operate, is allocated to and stored in the plurality of storage areas, wherein version information of each of the plurality of operation data units is stored in the operation data storage section;
- wherein at least one of the plurality of operation data units is a design data unit, which is used for the display section to draw an image; and
- an output section configured to output the version information of the plurality of operation data units and information about the plurality of storage areas to the rewrite apparatus while associating the plurality of storage areas with the version information of the plurality of operation data units; and the rewrite apparatus includes:
- an update data storage section configured to store a plurality of update data units and version information of each of the plurality of update data units, wherein the plurality of update data units corresponds to the plurality of operation data units stored in the operation data storage section;
- a selection section configured to select a target storage area, which is a target for data update, from the plurality of storage areas of the operation data storage section by comparing the version information of the plurality of operation data units, which is outputted from the output section, with the version information of the plurality of update data units stored in the update data storage section;
- a display device configured to give a notification to a worker by displaying:
  - a first item displaying the version information of the operation data units and the version information of the update data units side by side for comparison; and
  - a second item notifying that the target storage area can be changed; and
- an update section configured to, when the target storage area is selected after the display device gives the notification to the worker, update the selected target storage area with the update data unit that corresponds to the operation data unit presently stored in the target storage area; wherein the in-vehicle apparatus is a combination meter;
the plurality of storage areas of the combination meter include a speedometer area and a background area;
a program controlling an indicating needle of the speedometer of the combination meter is stored in the speedometer area as one of the plurality of operation data units;
the design data unit drawing a background on the combination meter is stored in the background area as another one of the plurality of operation data units;
the rewrite apparatus is provided separately from the combination meter and is detachably connectable to the vehicle by the worker;
when the rewrite apparatus is connected to the vehicle by the worker and becomes communicable with the combination meter via an in-vehicle network,
- (A) the selection section of the rewrite apparatus receives the version information of the plurality of operation data units from the output section of the combination meter and selects the target storage area from the plurality of storage areas of the combination meter by comparing the version information of the plurality of operation data units with the version information of the plurality of update data units stored in the rewrite apparatus,
- (B) the display device of the rewrite apparatus gives the notification to the worker by displaying (i) the first item displaying the version information of the operation data units and the version information of the update data units side by side for comparison and (ii) the second item notifying that the target storage area is changeable, and
- (C) when the target storage area is selected by the worker after the display device gives the notification, the update section of the rewrite apparatus sends the update data unit corresponding to the target storage area selected by the worker to the combination meter.

2. An in-vehicle apparatus for use in the data rewrite system recited in claim 1.

3. A rewrite apparatus for use in the data rewrite system recited in claim 1.

* * * * *